US008583778B1

(12) United States Patent
Faigon et al.

(10) Patent No.: US 8,583,778 B1
(45) Date of Patent: Nov. 12, 2013

(54) IDENTIFYING EXCEPTIONAL WEB DOCUMENTS

(75) Inventors: Ariel Faigon, Los Altos, CA (US); Timothy M. Converse, Sunnyvale, CA (US); Priyank S. Garg, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 938 days.

(21) Appl. No.: 11/412,360

(22) Filed: Apr. 26, 2006

(51) Int. Cl.
*G06F 17/30* (2006.01)

(52) U.S. Cl.
USPC .......... 709/224; 709/223; 709/225; 709/226; 705/14.23; 705/14.26; 705/14.47

(58) Field of Classification Search
USPC ................. 709/224, 225, 223, 226, 245, 246; 705/14; 707/3, 102
See application file for complete search history.

(56) References Cited

U.S. PATENT DOCUMENTS

| 6,269,370 | B1* | 7/2001 | Kirsch | 1/1 |
| 2006/0068755 | A1* | 3/2006 | Shraim et al. | 455/410 |
| 2006/0095404 | A1* | 5/2006 | Adelman et al. | 707/3 |
| 2006/0195442 | A1* | 8/2006 | Cone et al. | 707/5 |
| 2006/0212925 | A1* | 9/2006 | Shull et al. | 726/1 |
| 2006/0230380 | A1* | 10/2006 | Holmes et al. | 717/117 |
| 2007/0005417 | A1* | 1/2007 | Desikan et al. | 705/14 |
| 2007/0067297 | A1* | 3/2007 | Kublickis | 707/9 |
| 2007/0198603 | A1* | 8/2007 | Tsioutsiouliklis et al. | 707/202 |

OTHER PUBLICATIONS

"Internet Domain Name Scam"—Steven Yeates, Sep. 2004 ebookbrowse.com/internet-domain-name-scam-september-2004-pdf.*
"Domain Name Hijacking: Incidents, Threats, Risks, and Remedial Actions"—ICANN, Jul. 2005 "Domain Name Hijacking: Incidents, Threats, Risks, and Remedial Actions"—ICANN, Jul. 2005.*

* cited by examiner

*Primary Examiner* — Krista Zele
*Assistant Examiner* — Randy Scott
(74) *Attorney, Agent, or Firm* — Hickman Palermo Truong Becker Bingham Wong LLP; Daniel D. Ledesma

(57) ABSTRACT

Techniques are provided through which "suspicious" websites may be identified automatically. A suspicious website is one that is associated with many changes or an inconsistent number of changes in web registry information over time. Registry information is received when changes to the registry information occur. The registry information is referred to as a transaction. A transaction is comprised of a plurality of values that each correspond to a characteristic. A characteristic is a property of a website, such as the website's contact information. A count associated with a particular characteristic-value pair is updated each time the particular value is identified in a transaction. A high count indicates that the website associated with the particular value is associated with a lot of changes. Therefore, a website associated with a high count is suspicious. Other factors that may be used for identifying a "suspicious" website include how often and how much the count changes.

28 Claims, 5 Drawing Sheets

| Full Name | Org. Name | Address | Phone | Email | Domain Name |
|---|---|---|---|---|---|
| Spam A lot | Spammer, Inc. | 333 Shady Lane | (555) 555-1234 | user@spam.com | spam.com |

Transaction 202

FIG. 2A

Transaction Table 204

| FULL NAME | ORG. NAME | ADDRESS | PHONE | EMAIL | DOMAIN NAME |
|---|---|---|---|---|---|
| Rachel George | Legit Industries | 111 Warm Springs | (333) 123-3333 | rgeorge@safe.org | legit.com |
| Joseph Johnson | Going Up, Inc. | 22 Lazy Way | (222) 123-4444 | jj@okay.com | okay.com |
| James Evader | Deceive Co. | 789 Nowhere Place | (555) 555-1234 | user@deceive.com | Deceive.com |
| Sarah Smith | SpamDown | 1234 Hasty Ave. | (777) 777-7777 | ssmith@xspam.net | xspam.net |
| John Doe | Truth, Inc. | 777 Sun Blvd. | (333) 333-1234 | jdoe@integrity.org | integrity.org |
| ... | ... | ... | ... | ... | ... |
| Spam A lot | Spammer, Inc. | 333 Shady Lane | (555) 555-1234 | user@spam.com | spam.com |

FIG. 2B

Characteristic-value pair table 206

| PHONE | COUNT |
|---|---|
| (555) 555-5555 | 307 |
| (555) 123-4567 | 276 |
| (555) 555-1234 | 1008 |
| ... | ... |
| (444) 444-1234 | 691 |

FIG. 2C

Characteristic-value pair table 208

Pointer 212

| PHONE | COUNT |
|---|---|
| (555) 555-5555 | 307 |
| (555) 123-4567 | 276 |
| (555) 555-1234 | 1009 |
| ... | ... |
| (444) 444-1234 | 691 |

Pointer 210

FIG. 2D

Chart 300

Domain Name | IP Address | Name Server | NS IP Address | IP3 Address | NS IP3 Address

| spam.com | 64.125.73.8 | spamalotdns.tk | 68.123.456.9 | 64.125.73.0 | 68.123.456.0 |

Transaction 402

FIG. 4A

Transaction Table 404

| DOMAIN NAME | IP ADDRESS | NAME SERVER | NS IP ADDRESS | IP3 ADDRESS | NS IP3 ADDRESS |
|---|---|---|---|---|---|
| legit.com | 12.34.56.78 | yns.yahoo.com | 98.76.54.32 | 12.34.56.0 | 98.76.54.0 |
| okay.com | 234.53.86.7 | ns.domaintc.com | 66.125.2.37 | 234.53.86 | 66.125.2.37 |
| Deceive.com | 64.125.73.8 | spamalotdns.tk | 68.123.56.9 | 64.125.73.0 | 68.123.56.0 |
| xspam.net | 3.4.5.122 | yns.yahoo.com | 98.76.54.32 | 3.4.5.0 | 98.76.54.0 |
| integrity.org | 111.222.111.6 | ns.names.com | 123.45.91.46 | 111.222.111.0 | 123.45.91.0 |
| ... | ... | ... | ... | ... | ... |
| spam.com | 64.125.73.8 | puredns.com | 68.123.56.9 | 64.125.73.0 | 68.123.56.0 |

FIG. 4B

Characteristic-value pair table 406

| IP ADDRESS | COUNT |
|---|---|
| 234.53.86.7 | 16 |
| 3.4.5.122 | 35 |
| 64.125.73.8 | 250 |
| ... | ... |
| 111.222.111.6 | 4 |

Pointer 412

Pointer 410

FIG. 4C

IDENTIFYING EXCEPTIONAL WEB DOCUMENTS

FIELD OF THE INVENTION

The present invention relates to search engines and, more specifically, to a technique for automatically identifying websites characterized as spam sites.

BACKGROUND

Search engines that enable computer users to obtain references to web pages that contain one or more specified words are now commonplace. Typically, a user can access a search engine by directing a web browser to a search engine "portal" web page. The portal page usually contains a text entry field and a button control. The user can initiate a search for web pages that contain specified query terms by typing those query terms into the text entry field and then activating the button control. When the button control is activated, the query terms are sent to the search engine, which typically returns, to the user's web browser, a dynamically generated web page that contains a list of references to other web pages that contain or are related to the query terms.

Usually, such a list of references will be ranked and sorted based on some criteria prior to being returned to the user's web browser. Web page authors are often aware of the criteria that a search engine will use to rank and sort references to web pages. Because web page authors want references to their web pages to be presented to users earlier and higher than other references in lists of search results, some web page authors are tempted to artificially manipulate their web pages, or some other aspect of the network in which their web pages occur, in order to artificially inflate the rankings of references to their web pages within lists of search results.

For example, if a search engine ranks a web page based on the value of some attribute of the web page, then the web page's author may seek to alter the value of that attribute of the web page manually so that the value becomes unnaturally inflated. For example, a web page author might fill his web page with hidden metadata that contains words that are often searched for, but which have little or nothing to do with the actual visible content of the web page. For another example, a web page author might create many domains and generate links from those domains to his web page in order to artificially boost the number of links to his web page so that it appears to the search engine that his web page is popular. Such techniques are referred to as "spamming" and websites that contain web pages created for such a purpose is referred to as "web spam."

When web page authors engage in these tactics, the perceived effectiveness of the search engine is reduced. References to web pages which have little or no actual "earned" merit (i.e. web spam) are sometimes pushed above references to web pages that users have previously found interesting or valuable for legitimate reasons. Thus, it is in the interests of those who maintain the search engine to "weed out," from search results, references to web pages that are known to have been artificially manipulated in the manner discussed above. However, because there are so many web pages accessible through the Internet, and because the Internet is a dynamic entity, always in flux, manually examining and investigating every existing web page is a daunting and expensive, if not downright futile, task. Furthermore, web spam authors often "move" their web pages to a different domain in order to deter detection and continue their work, and thus it is difficult to track such authors.

What is needed is an automated way of identifying web pages that are likely to have been manipulated in a manner that artificially inflates rankings of references to those web pages within lists of search results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-D illustrate an example of a transaction, a table to store transactions, and a characteristic-value pair table that is updated based on the transaction, according to an embodiment of the invention;

FIGS. 4A-C illustrate a second example of a transaction, a table to store transactions, and a characteristic-value pair table that is updated based on the transaction, according to an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1:
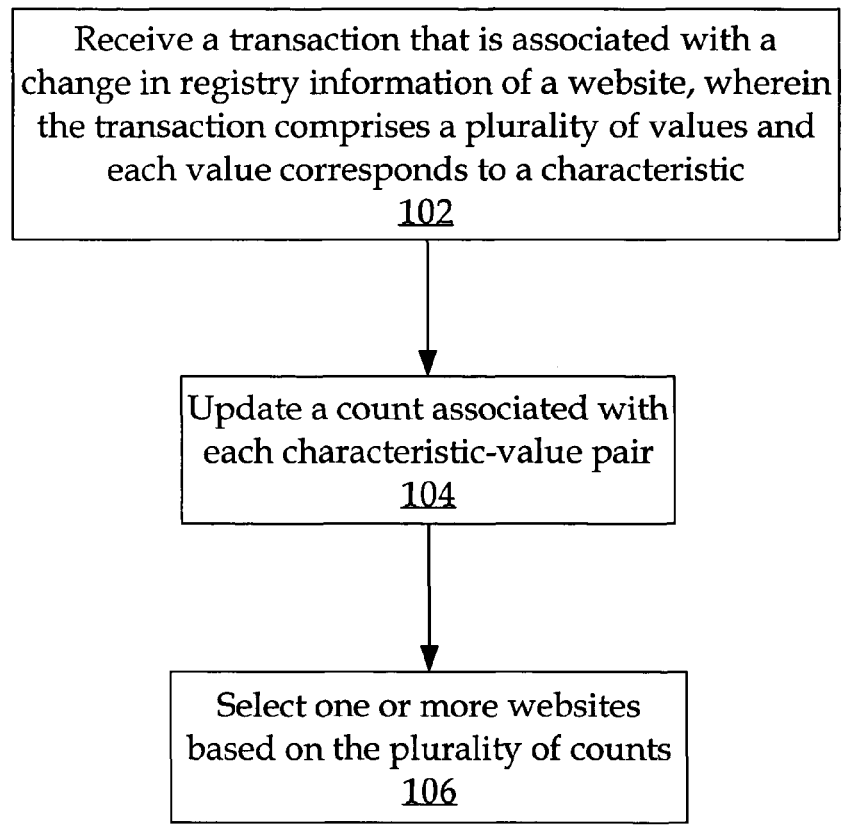
FIG. 1 is a flow diagram that illustrates steps to perform in order to determine which websites may be spam sites, according to an embodiment of the invention.

Techniques are provided through which "suspicious" websites may be automatically identified and selected. A "suspicious" website is one that is associated with relatively many changes in website registry information. FIG. 1 is a flow diagram that illustrates a technique for determining which websites may be spam sites, according to an embodiment of the invention. At step 102, registry information is received when changes to a registry occur. Registry information may be viewed as a "transaction" which is comprised of a plurality of values that correspond to a plurality of characteristics. An example of a characteristic of a website may be the contact information of the website's author. A count associated with a characteristic-value pair is updated each time a particular value occurs in a transaction (step 104). This count indicates a number of transactions in which the particular value has occurred in association with the characteristic and, thus, can be used to determine whether a website associated with the particular value may be "suspicious." Based on a plurality of counts, one or more websites are selected (step 106), e.g., as being "suspicious." Therefore, a suspicious website is one that is associated with a characteristic-value pair that has a high count. Other factors that may be used for identifying and selecting suspicious websites include the extent to which the count changes over time.

Registry Information

If an individual desires to obtain a domain name, then the individual may contact a domain name registrar that is responsible for selling domain names. In order to obtain a website, the individual typically provides contact information to the registrar. The registrar then maintains an association between the contact information and the website the individual registered. For example, for each website, the registrar may maintain administrative, technical, and billing contact information for the particular website (called "whois data"). This contact information typically includes a registrant's full name, organization name, home/business address, phone number, and email address. Whois data may also include the name of the registrar, a domain's status (e.g. active, expired, pending delete, locked), when the domain was created, when it expires, and when it was last updated.

This registry information may be obtained and used to select websites that are likely to be web spam. Registry information may be obtained whenever a domain is added, deleted, or modified. Thus, whenever a domain is added, deleted, modified, or removed, a transaction may be generated. Registry information may be thought of as a transaction comprised of a plurality of values. Each value of the plurality of values corresponds to a characteristic. A characteristic is a property of a website that corresponds to registry changes.

Typically, registrars require three contacts: a technical contact, an administrative contact, and a billing contact. Thus, a transaction may include sixteen values corresponding to sixteen characteristics.

In one embodiment, a plurality of characteristics of a transaction includes the full name of the registrant, the name of the registrant's organization, the registrant's business or personal address, the registrant's business or personal phone number, the registrant's business or personal email, and the domain name of the website. One such transaction may be a transaction 202 illustrated in FIG. 2A, where the value "Spam Alot" corresponds to the full name characteristic, the value "Spammer, Inc." corresponds to the organization name characteristic, and so forth. Transaction 202 may be added to a table of all transactions ever received or all transactions received over a period of time. Transaction table 204, illustrated in FIG. 2B, is an example of how a transaction table might look like after transaction 202 is received.

Generating a Plurality of Counts

When a transaction is received from a registrar, the transaction might need to be parsed so a determination can be made as to whether some of the values corresponding to the characteristics (e.g. a particular phone number) are included in the transaction. For example, a transaction might not include a phone number for the billing contact of a registrant. Therefore, in one embodiment, a transaction processing mechanism includes logic for determining which values correspond to which characteristics.

According to one embodiment, once a plurality of values that correspond to a plurality of characteristics has been extracted from a transaction, a count associated with each characteristic-value pair is updated.

Counts are maintained for the following reasons. Authors of web spam tend to change certain characteristics of their websites (such as domain name to avoid some web spam detectors) while keeping other characteristics, such as contact information, the same. However, it is difficult and time-consuming to determine whether a particular website is "legitimate" without having to manually review the web pages of the website.

To assist in selecting websites that may be spam sites, the count is used to identify the values that do not change much, even though the goal is to determine the websites that do change. The websites associated with those values can then be selected and identified as suspicious. Thus, for example, when a particular phone number occurs in an unusually high number of transactions, then it may be likely that the websites associated with that particular phone number are spam sites.

For certain characteristics, such as name servers, characteristic-value pairs (e.g. [name server, spammy-ns.tk]) that appear only once or a very few times and then disappear and never return are also suspect, and thus the websites associated with those characteristic-value pairs. In summary, any activity (that is tracked with a count), associated with a characteristic, that is considered unusual or irregular relative to the characteristic is suspect.

A count for each characteristic-value pair may be maintained in a list or table, such as characteristic-value pair table 206, illustrated in FIG. 2C. A specific characteristic-value pair table may be maintained for each characteristic. Table 206 corresponds to the billing contact phone number of a registrant. Thus, in table 206, the characteristic is "billing contact phone number." The column on the left indicates the actual billing contact phone numbers (i.e. values) that have occurred (or have been identified) in previous transactions. The column on the right corresponds to the count associated with each value. The count indicates how many times a particular value has occurred in association with the particular characteristic in previous transactions. For example, the characteristic-value pair of billing contact phone number and (555) 555-1234 has a count of 1008 (highlighted), which indicates that (555) 555-1234 has occurred in 1008 previous transactions as a billing contact phone number.

Table 208 of FIG. 2D is an example of how table 206 might look after the submission of transaction 202 has caused table 206 to be updated. The updated row is highlighted.

In one embodiment, the count may be incremented by another number (e.g. non-integer) that may or may not indicate a weight given to a particular value of a characteristic-value pair. For example, because the billing contact phone number might not occur in many transactions, the count might be incremented by 2.5 to make up for the lack of billing contact phone number values.

In one embodiment, the count is associated only with a value instead of a characteristic-value pair. For example, instead of having three separate tables for each contact phone number (i.e. technical, administrative, billing) and thus three separate counts, in one embodiment, a count is associated with the actual phone number value. Thus, if the technical, administrative, and billing contact phone numbers of a transaction were all (555) 555-1234, then only one count (for (555) 555-1234) would be updated, instead of three separate counts.

Selecting One or More Websites

Based on the counts generated above for each characteristic-value pair (or for each value), one or more websites are selected from a plurality of websites. The websites may correspond to a domain name, such as the domain name in the above example transaction. Each value from a characteristic-value pair is associated with the one or more transactions in which the value occurred. Thus, because each value is associated with a count, the count is associated with the corresponding transactions in which that value occurred.

For example, each characteristic-value pair list or table may contain a list of pointers to transactions that included that value. The pointers may point to transactions stored in a transaction table, such as transaction table 204 in FIG. 2B. Such pointers may be pointers 210 and 212 spanning FIGS. 2D and 2B (other pointers are not shown). Then, once a threshold number of counts of a particular value has been reached or exceeded, the list of pointers may be followed to access the transactions associated with the corresponding characteristic-value pair.

As another example, an index (e.g. B-tree index) may be maintained (instead of or in conjunction with characteristic-value pair tables 206 and 208) where the key of the index is a characteristic of a characteristic-value pair and entries in the index include a key value (that corresponds to a value of the characteristic-value pair) and pointers to transactions that included that key value.

Count Rate of Change

According to an embodiment, the rate at which a particular count changes is determined and the step of selecting one or more websites is also based on that rate. For example, if the count for a particular billing contact phone number is 20 on one day and 40 on the next day, the rate of change is 100%. If the count is instead 10 on the next day, then the rate of change would be 50%.

By determining the rate of change of a count, it is possible to keep track of transactions that occurred over a just few days (rather than over many days or months) and still discover "big movers" in relative percentage from day to day. This method of tracking the rate of change of the count helps to identify the small "hit and run" web spam authors as well as the large web spam authors. For example, while only five registry changes with a particular contact phone number is considered small and insignificant, moving from zero to five in one day and then back to zero the following day is a significant indication of potential web spam.

Share-of-Total

According to an embodiment, in addition to tracking the number of counts for each value in a transaction, a "share-of-total" is determined for a particular value of a certain characteristic. "Share-of-total" refers to the share of changes in one day that pertain to a certain characteristic, where the certain characteristic may be any characteristic. For example, the certain characteristic may be name server, name server IP address, or registrar. The "share-of-total" values include a mean value and a standard deviation of a certain characteristic-value pair, such as [name server, spamalotdns.tk], where "name server" is the characteristic and "spamalotdns.tk" is the corresponding value. The "share-of-total" values indicate which particular, e.g. name server(s), is associated with the most changes. The name servers associated with the most changes are more suspect of manipulating data.

Figure 3:
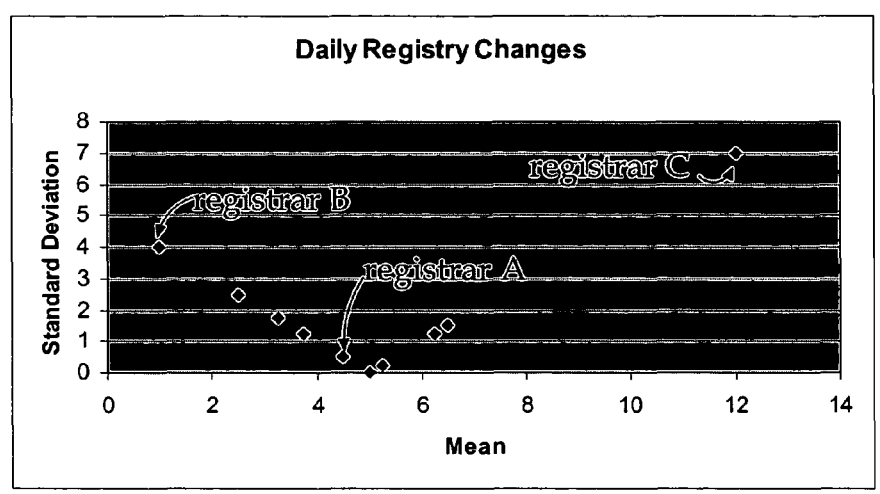
FIG. 3 is a chart that illustrates the average share of the total registry changes associated with a characteristic-value pair of a certain characteristic and the standard deviation of the total registry changes associated with that characteristic-value pair, according to an embodiment of the invention.

FIG. 3 is an example chart 300 that illustrates a mean value for each name server of a plurality of name servers, wherein the mean value associated with a particular name server is the average percentage of the total daily registry changes of all name servers, according to an embodiment of the invention. Chart 300 also shows the standard deviation associated with each of the name servers. Thus, each data point represents a particular name server. Embodiments of the invention are not limited to daily changes. Any other period of time for tracking registry changes may be used.

The mean value associated with a characteristic, e.g. name server, may be generated by adding up the total number of registry changes associated with a particular name server and dividing by the total number of registry changes associated with all name servers that are tracked. Based on the mean value associated with the particular name server, the standard deviation for that mean value may be generated.

In this example, name server A has a mean value of 4.5% of the total daily registry changes with a relatively small standard deviation (i.e. 0.5%) of the total daily registry changes. Name server B has a mean value of 1% of the total daily registry changes and a 4% standard deviation. From this data, name server B is much more "inconsistent" over time, and thus more suspect of manipulating data. Also, name server C is suspect because it has a standard deviation of 7%. Based on this information, websites associated with name servers A and C may be flagged as suspicious and later determined to be spam sites.

Another Example

FIGS. 4A-C illustrate a transaction 402, a transaction table 404, a characteristic-value pair table 406, and pointers 410 and 412, according to an embodiment of the invention. The plurality of characteristics of a website in this example are the domain name, the IP address, a name server that serves the domain, the IP address of the name server, and the first three octets of both IP addresses (i.e. IP3 address).

Transaction 402 is received upon a modification to a record pertaining to a website in a registry. For example, transaction 402 may be received soon after the domain of "spam.com" is created. The transaction is stored in transaction table 404. Characteristic-value pair table 406 is updated to reflect all the domain IP addresses that have occurred in received transactions and how many of each domain IP address has occurred. In this example, IP address 64.125.73.8 is updated to a count of 250.

Suppose a threshold count of 250 indicates that a website is suspicious. Once that threshold is reached relative to a particular IP address, pointers to the actual transactions are followed to determine which domain names and name servers are associated with that particular IP address. Table 406 may contain one or more pointers for each characteristic-value pair entry to transaction table 404. Specifically, in one embodiment, pointers 410 and 412 are used to access the appropriate rows (or records) in transaction table 404. Other pointers from table 406 to transaction table 404 are not shown.

After using pointers 410 and 412 to access the appropriate rows in transaction table 404, it may be determined that "spam.com" and "deceive.com" are spam sites. This determination may be solely on the count, on the rate of change of the count, on other criteria, and/or on the results of a manual inspection of the two websites.

Hardware Overview

Figure 5:
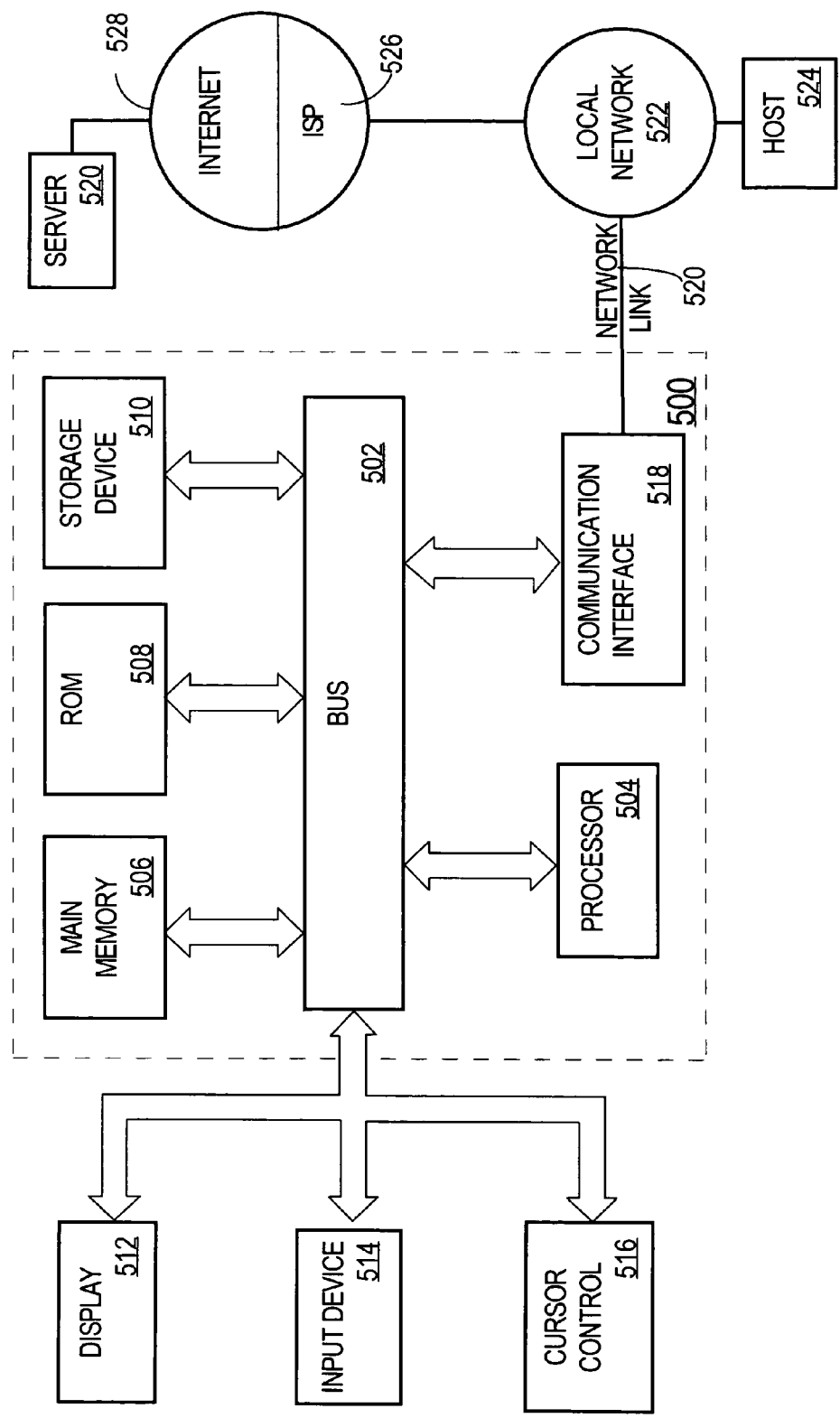
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   storing a count that indicates how many entries in website registry information have a particular value for a particular characteristic, wherein each entry of the entries in the website registry information includes a value for each of a plurality of characteristics;
   wherein said particular characteristic is one of registrar, name server, or at least a portion of a name server IP address;
   identifying a plurality of distinct values for the particular characteristic;
   for each time period of a plurality of time periods, performing the step of:
      for each distinct value in the plurality of distinct values, calculating a percentage share value that indicates the percentage of the entries in the website registry information that have the distinct value for the particular characteristic;
   based on the percentage share value of each distinct value of the plurality of distinct value for each time period of the plurality of time periods, calculating a deviation value for said each distinct value;
   based on the calculated deviation values, identifying, as suspicious, one or more websites that are associated with the entries that have the particular value for the particular characteristic;
   wherein the step of storing the count is performed on one or more computing devices.

2. The method of claim 1, wherein:
   the calculated deviation values indicate irregular behavior associated with that particular characteristic.

3. A computer-implemented method comprising the steps of:
   storing a plurality of counts, wherein each count of the plurality of counts indicates how many entries in website registry information have a particular value for a particular characteristic during a corresponding time period, wherein each entry of the entries in the website registry information includes a value for each of a plurality of characteristics;
   wherein the plurality of counts includes a first count that is associated with a first time period;
   wherein the plurality of counts includes a second count that is associated with a second time period that is different than the first time period;
   calculating a rate of change that is based on the first count and the second count;
   selecting one or more websites from a plurality of websites based, at least in part, on the rate of change;
   wherein the one or more websites are associated with the particular value for the particular characteristic;
   wherein the step of storing is performed by one or more computing devices.

4. The method of claim 3, wherein the entries are received over a certain period of time.

5. The method of claim 3, further comprising receiving a plurality of entries from a plurality of registrars, wherein the plurality of entries includes (a) a first plurality that are received from a first registrar and (b) a second plurality that are received from a second registrar.

6. The method of claim 3, wherein selecting the one or more websites comprises:
   identifying a subset of entries, from a plurality of entries of website registry information, that are associated with a particular registrar or a particular name server that is associated with the first count and the second count; and
   identifying, within the subset of entries, the one or more websites.

7. The method of claim 3, wherein calculating the rate of change comprises dividing the first count by the second count.

8. The method of claim 3, wherein the step of storing is performed by an entity that maintains a search engine that ranks web pages.

9. A computer-implemented method comprising the steps of:
   generating a plurality of counts by updating, based on one or more changes in website registry information indicated in one or more transactions that each comprises a plurality of values, a count for each value in the plurality of values, wherein:
      one of the plurality of values corresponds to one of contact information, domain name, name server, at least a portion of a domain IP address, at least a portion of a name server IP address, or registrar;
      a count is associated with said each value, in the plurality of values, that has occurred in a plurality of transactions;
      the count indicates how many times said each value has occurred in the plurality of transactions; and
      each transaction of the plurality of transactions corresponds to a change in website registry information;
   wherein the plurality of counts includes a first count (a) that is associated with a particular value of the plurality of values and (b) that is associated with a first time period;
   wherein the plurality of counts includes a second count (c) that is associated with the particular value and (d) that is associated with a second time period that is different than the first time period;
   calculating a rate of change that is based on the first count and the second count; and
   based on the plurality of counts and the rate of change, selecting one or more websites from a plurality of websites;
   wherein the one or more websites are associated with the particular value;
   wherein the step of generating the plurality of counts is performed on one or more computing devices.

10. The method of claim 9, wherein:
    selecting the one or more websites from the plurality of websites is based on a particular count of the plurality of counts;
    the particular count is associated with the particular value; and
    the particular count indicates irregular behavior associated with that particular value.

11. The method of claim 9, wherein the plurality of values corresponds to a plurality of characteristics and the plurality of characteristics comprise whois registry information.

12. The method of claim 9, wherein the plurality of values corresponds to a plurality of characteristics and the plurality of characteristics comprise two or more of the following: contact information, registrar, domain name, name server, domain IP address, name server IP address, the first three octets of the domain IP address, or the first three octets of the name server IP address.

13. A computer-implemented method comprising the steps of:
    generating a plurality of counts by updating, based on one or more changes in website registry information indicated in one or more transactions that each comprises a plurality of values, a count for each characteristic-value pair in a plurality of characteristic-value pairs, wherein:

each value corresponds to a characteristic;

characteristics from the plurality of characteristic-value pairs comprise whois registry information;

a count is associated with said each characteristic-value pair in the plurality of characteristic-value pairs;

for each characteristic-value pair, the count associated with that pair indicates how many times a value associated with a characteristic for that characteristic-value pair has occurred in a plurality of transactions; and each transaction of the plurality of transactions corresponds to a change in website registry information;

wherein the plurality of counts includes a first count (a) that is associated with a particular characteristic-value pair in the plurality of characteristic-value pairs and (b) that is associated with a first time period;

wherein the plurality of counts includes a second count (c) that is associated with the particular characteristic-value pair and (d) that is associated with a second time period that is different than the first time period;

calculating a rate of change that is based on the first count and the second count; and based on the plurality of counts and the rate of change, selecting one or more websites from a plurality of websites;

wherein the one or more websites are associated with the particular characteristic-value pair;

wherein the step of generating the plurality of counts is performed on one or more computing devices.

14. The method of claim 13, wherein a plurality of characteristics from the plurality of characteristic-value pairs comprise two or more of the following: contact information, registrar, domain name, name server, domain IP address, name server IP address, the first three octets of the domain IP address, or the first three octets of the name server IP address.

15. One or more non-transitory computer-readable media storing instructions which, when executed by one or more processors, cause:

storing a count that indicates how many entries in website registry information have a particular value for a particular characteristic, wherein each entry of the entries in the website registry information includes a value for each of a plurality of characteristics;

wherein said particular characteristic is one of registrar, name server, or at least a portion of a name server IP address;

identifying a plurality of distinct values for the particular characteristic;

for each time period of a plurality of time periods, performing the step of:

for each distinct value in the plurality of distinct values, calculating a percentage share value that indicates the percentage of the entries in the website registry information that have the distinct value for the particular characteristic;

based on the percentage share value of each distinct value of the plurality of distinct value for each time period of the plurality of time periods, calculating a deviation value for said each distinct value;

based on the calculated deviation values, identifying, as suspicious, one or more websites that are associated with the entries that have the particular value for the particular characteristic.

16. The one or more non-transitory computer-readable media of claim 15, wherein:

the calculated deviation values indicate irregular behavior associated with that particular characteristic.

17. One or more non-transitory computer-readable media storing instructions which, when executed by one or more processors, cause:

storing a plurality of counts, wherein each count of the plurality of counts indicates how many entries in website registry information have a particular value for a particular characteristic during a corresponding time period, wherein each entry of the entries in the website registry information includes a value for each of a plurality of characteristics;

wherein the plurality of counts includes a first count that is associated with a first time period;

wherein the plurality of counts includes a second count that is associated with a second time period that is different than the first time period;

calculating a rate of change that is based on the first count and the second count;

selecting one or more websites from a plurality of websites based, at least in part, on the rate of change;

wherein the one or more websites are associated with the particular value for the particular characteristic.

18. The one or more non-transitory computer-readable media of claim 17, wherein the entries are received over a certain period of time.

19. The one or more non-transitory computer-readable media of claim 17, wherein the instructions, when executed by the one or more processors, further cause receiving a plurality of entries from a plurality of registrars, wherein the plurality of entries includes (a) a first plurality that are received from a first registrar and (b) a second plurality that are received from a second registrar.

20. The one or more non-transitory computer-readable media of claim 17, wherein selecting the one or more websites comprises:

identifying a subset of entries, from a plurality of entries of website registry information, that are associated with a particular registrar or a particular name server that is associated with the first count and the second count; and identifying, within the subset of entries, the one or more websites.

21. The one or more non-transitory computer-readable media of claim 17, wherein calculating the rate of change comprises dividing the first count by the second count.

22. The one or more non-transitory computer-readable media of claim 17, wherein the step of storing is performed by an entity that maintains a search engine that ranks web pages.

23. One or more non-transitory computer-readable media storing instructions which, when executed by one or more processors, cause:

generating a plurality of counts by updating, based on one or more changes in website registry information indicated in one or more transactions that each comprises a plurality of values, a count for each value in the plurality of values, wherein:

one of the plurality of values corresponds to one of contact information, domain name, name server, at least a portion of a domain IP address, at least a portion of a name server IP address, or registrar;

a count is associated with said each value, in the plurality of values, that has occurred in a plurality of transactions;

the count indicates how many times said each value has occurred in the plurality of transactions; and each transaction of the plurality of transactions corresponds to a change in website registry information;

wherein the plurality of counts includes a first count (a) that is associated with a particular value of the plurality of values and (b) that is associated with a first time period;

wherein the plurality of counts includes a second count (c) that is associated with the particular value and (d) that is associated with a second time period that is different than the first time period;

calculating a rate of change that is based on the first count and the second count; and based on the plurality of counts and the rate of change, selecting one or more websites from a plurality of websites;

wherein the one or more websites are associated with the particular value.

24. The one or more non-transitory computer-readable media of claim 23, wherein:

selecting the one or more websites from the plurality of websites is based on a particular count of the plurality of counts;

the particular count is associated with the particular value; and the particular count indicates irregular behavior associated with that particular value.

25. The one or more non-transitory computer-readable media of claim 23, wherein the plurality of values corresponds to a plurality of characteristics and the plurality of characteristics comprise whois registry information.

26. The one or more non-transitory computer-readable media of claim 23, wherein the plurality of values corresponds to a plurality of characteristics and the plurality of characteristics comprise two or more of the following: contact information, registrar, domain name, name server, domain IP address, name server IP address, the first three octets of the domain IP address, or the first three octets of the name server IP address.

27. One or more non-transitory computer-readable media storing instructions which, when executed by one or more processors, cause:

generating a plurality of counts by updating, based on one or more changes in website registry information indicated in one or more transactions that each comprises a plurality of values, a count for each characteristic-value pair in a plurality of characteristic-value pairs, wherein:

each value corresponds to a characteristic;

characteristics from the plurality of characteristic-value pairs comprise whois registry information;

a count is associated with said each characteristic-value pair in the plurality of characteristic-value pairs;

for each characteristic-value pair, the count associated with that pair indicates how many times a value associated with a characteristic for that characteristic-value pair has occurred in a plurality of transactions; and each transaction of the plurality of transactions corresponds to a change in website registry information;

wherein the plurality of counts includes a first count (a) that is associated with a particular characteristic-value pair in the plurality of characteristic-value pairs and (b) that is associated with a first time period;

wherein the plurality of counts includes a second count (c) that is associated with the particular characteristic-value pair and (d) that is associated with a second time period that is different than the first time period;

calculating a rate of change that is based on the first count and the second count; and based on the plurality of counts and the rate of change, selecting one or more websites from a plurality of websites;

wherein the one or more websites are associated with the particular characteristic-value pair.

28. The one or more non-transitory computer-readable media of claim 27, wherein a plurality of characteristics from the plurality of characteristic-value pairs comprise two or more of the following: contact information, registrar, domain name, name server, domain IP address, name server IP address, the first three octets of the domain IP address, or the first three octets of the name server IP address.

* * * * *